United States Patent
Kim et al.

[11] Patent Number: 5,889,131
[45] Date of Patent: Mar. 30, 1999

[54] ITACONATE COPOLYMER EXHIBITING SECOND-ORDER NONLINEAR OPTICAL PROPERTIES

[75] Inventors: Nak Joong Kim, Seoul; Dong Hoon Choi, Kyungki-do; Sang Yup Song, Seoul, all of Rep. of Korea

[73] Assignee: Korea Institute of Science and Technology, Seoul, Rep. of Korea

[21] Appl. No.: 971,733

[22] Filed: Nov. 17, 1997

[30] Foreign Application Priority Data

Nov. 15, 1996 [KR] Rep. of Korea ................. 96-54494

[51] Int. Cl.$^6$ ............... C08F 222/40; C08F 224/00; C08F 226/02; C08F 220/26; C08F 220/10

[52] U.S. Cl. .............. 526/262; 526/310; 526/311; 526/320; 526/328.5; 526/273

[58] Field of Search .................. 526/262, 273, 526/310, 311, 320, 328.5

[56] References Cited

U.S. PATENT DOCUMENTS 5,239,013  8/1993  Francis et al. ................ 525/328.2

OTHER PUBLICATIONS

S. Jacobson et al, "Nonlinear Optical Polymers in Advanced Photonics", Journal of Applied Polymer Science, vol. 53, pp. 649–663 (1994).

D. Jungbauer et al, "Highly Efficient and Stable Nonlinear Optical Polymers Via Chemical Crosslinking Under Electric Field", Appl. Phys. Lett., vol. 56, No. 26, pp. 2610–2612 (Jun. 25, 1990).

*Primary Examiner*—Jeffrey Smith
*Assistant Examiner*—Wu C. Cheng
*Attorney, Agent, or Firm*—Oblon, Spivak, McClelland, Maier & Neustadt, P.C.

[57] ABSTRACT

A side-chain type second-order nonlinear optical polymer compound having a repeating unit as represented in general structure (I), —(—MO—)$_m$--(—ITCN—NLO—)$_n$—, wherein the sum of m and n is from 5 to 10000 and m and n satisfy m/(m+n)=from 0.05 to 0.95; ITCN—NLO is

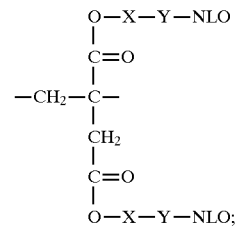

X is not present, or represents alkylene having from 1 to 6 carbon atoms or aromatic hydrocarbon having from 6 to 12 carbon atoms; Y is a bonding group selected from the group consisting from ether, ester, amide, alkylamino having from 1 to 5 carbon atoms, carbamate and sulfone; NLO is a general second-order nonlinear optical chemical group in which a conjugated aromatic ring can be unsubstituted or substituted by an electron-donor and/or electron-acceptor; and MO is any polymerizable monomer copolymerizable with ITCN—NLO, and a nonlinear optical material prepared with the same arc disclosed. The side-chain type polymer compound of the present invention have very high second-order nonlinear optical properties with superior thermal resistance, transparency and processability for thin film formation.

14 Claims, 1 Drawing Sheet

ITACONATE COPOLYMER EXHIBITING SECOND-ORDER NONLINEAR OPTICAL PROPERTIES

BACKGROUND OF THE INVENTION

The present invention relates to a high performance polymer material exhibiting second-order nonlinear optical properties, which can be used in ultrahigh-speed electrooptic modulators for high-capacity optical communication or frequency doubling devices for a semiconductor laser and the like, and a process for preparing the same.

A nonlinear optical material is a key material in optoelectronic technology (in a broader sense, optical technology) capable of allowing high-capacity information communication, storage and calculation at ultrahigh speed and high density which exceeds the limits of present fine technology in the field of semiconductor. Extensive research has been conducted for the development of material for semiconductor, ferroelectric inorganic crystalline and organic compound, etc. As a result, it was theoretically and experimentally verified that molecular organic compounds having conjugated π-electron exhibit extremely excellent nonlinear optical properties compared with inorganic type materials as described in *Chemical Review*, Vol. 94, No. 1, pp. 1–278 published by the American Chemical Society in 1994. The research in this area has progressed extensively.

In particular, a side-chain type organic polymer material exhibiting second-order nonlinear optical properties, as described in U.S. Pat. Nos. 4,694,066, 4,775,574 and 4,762,912 and the like has superior processability, optical transparency, and higher nonlinear optical constant than $LiNbO_3$ which is a commercial nonlinear optical crystal, and thereby is seen to be preferred material with which to prepare a short-wavelength optical source according to second harmonic generation and a common-waveguide type, ultrahigh-speed electrooptic modulator. For example, these materials have been used experimentally to manufacture ultrahigh-speed modulator devices having tens of $GH_2$ bands in optical communication as described in *Journal of Polymer Science*, Vol. 53, pp. 649–663, 1994, etc. Such second-order nonlinear optical materials can be synthesized by direct bonding of chemical groups having high molecular hyperpolarizability to the side chain of a polymer. Thin film of these materials can be prepared by means of conventional coating technologies such as spin coating, dip coating and the like. The second-order nonlinear optical polymer material thus prepared forms an asymmetric structure of which the dipole moment of the chemical group is oriented in one direction via an electric-field poling process. Such an asymmetrically oriented structure is considerably relevant to the properties of a second-order nonlinear optical device. That is, since the properties of a device increase linearly with the orientation of the dipole forming asymmetric structure, it is very important for the preparation of a device having good performance that an electric-field poling capable of providing the device with maximum orientation and suppressing orientation relaxation during manufacture or use of the optical device. Generally, an asymmetric structure in a molecule can be formed easily by corona discharge, or by a contact poling using electrodes coated on both surfaces of a thin film. However, a certain method is required to suppress spontaneous thermal orientation relaxation of the asymmetric structure to a symmetric structure that is, in terms of energy, a stable state during manufacture or use of the optical device. Also, such asymmetric structure in a molecule with the fact that the high nonlinear optical effect appears in the region of 1.3 to 1.5 microns which is the wavelength band for optical communication, have been very considerably recognized.

Further, the significance of a very high second-order nonlinear optical constant, which is also a property of the polymers of the present invention, has been increasing since it allows the reduction of voltage applied when driving an optical device.

The method for suppressing spontaneous thermal orientation relaxation can be divided into two main classes: (1) the method of forming a crosslinked structure in a compound with heat or light when applying poling treatment and (2) the method of using a side-chain type second-order nonlinear optical polymer having a high glass transition temperature.

The method of forming a crosslinked structure in a compound using epoxy type thermosetting material with the chemical group exhibiting nonlinear optical properties is disclosed in *Applied Physics Letter*, Vol. 56, No. 26, pp. 2610–2613. This method provides the formation of a highly crosslinked, asymmetric oriented structure by properly controlling an electric-field poling and thermosetting reaction. Further, it was proved that the compound's nonlinear optical constant, $d_{33}$ is very high (as much as 42 pm/V) and that the compound provides good suppression of the thermal orientation relaxation.

Nevertheless, a problem of the thermosetting crosslinked polymer described above is that its density distribution is uneven due to its highly crosslinked structure, and the preparation of homogeneous thin film is difficult since low molecular weight material is used in preparation thereof. Thus, light scattering is derived from polarized thermosetting thin film material. Also, up to the present, the $d_{33}$ value of a highly crosslinked polymer does not reach that of inorganic materials and it is not practical to use this polymer to make an optical device.

In the method using a side-chain type, second-order nonlinear optical polymer, since high molecular material is used, a thin film which is optically homogeneous can be easily prepared by means of spin coating and the like. Also, the thin film having a high nonlinear optical constant and exhibiting superior optical properties without the loss due to light scattering can be prepared by polarizing the thin film in the vicinity of its glass transition temperature and then cooling to fix the polarized thin film. Accordingly, a side-chain type, second-order nonlinear optical polymer is considered to be a material well-suited for use in the preparation of an integrated optical device.

However, a side-chain type polymer described above is known to have the disadvantage that thermal orientation relaxation occurs when manufacturing or using a device made with the polymer. The use of a side-chain type nonlinear optical polymer having high glass transition temperature has been suggested as a solution for this problem, but other problems are encountered as the fact that electric-field poling process becomes difficult as the glass transition temperature increases and the breakage of a nonlinear optical chemical group occurs at high temperature.

BRIEF SUMMARY OF THE INVENTION

The present inventors have conducted extensive and intensive studies to integrally solve the problems of said two methods. As a result, the present invention is based on the inventor's discovery that a novel nonlinear optical polymer material having high a nonlinear optical constant and thermal stability can solve the above-described problems.

Therefore, it is an object of the present invention to provide a novel polymer material having high a nonlinear optical constant and thermal stability and exhibiting nonlinear optical properties.

It is an another object of the present invention to provide a novel nonlinear optical material.

The said objects and other objects, features and advantages of the present invention will be more distinctly understood by referring to the following detailed description of the present invention.

BRIEF DESCRIPTION OF THE SEVERAL VIEWS OF THE DRAWING

Hereinafter, the present invention will be described in greater detail from the following detailed description taken in connection with the accompanying drawings in which.

DETAILED DESCRIPTION OF THE INVENTION

Figure 1:
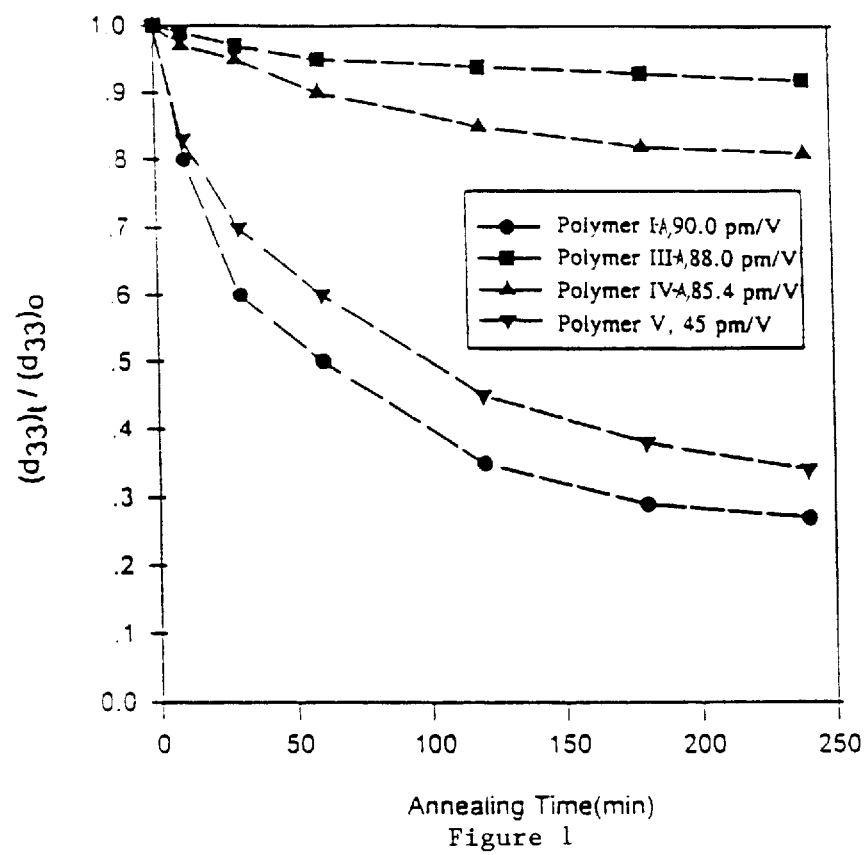
FIG. 1 is a graph comparing the second-order nonlinear optical constants, $d_{33}$ values and the thermal stabilities of side-chain type, second-order nonlinear optical itaconate copolymers of the present invention (I-A, III-A and IV-A) with the optical constant, $d_{33}$ value and the thermal stability of methylmethacrylate type, side-chain type nonlinear optical polymer (V) which is a common side-chain type polymer, respectively.

The above objects of the present invention can be accomplished by using a side-chain type, second-order nonlinear optical polymer compound having a repeating unit as represented in general structure (I)

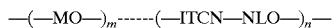   (I)

wherein
the sum of m and n is from 5 to 10000 and m and n satisfy m/(m+n)=from 0.05 to 0.95;

ITCN-NLO is

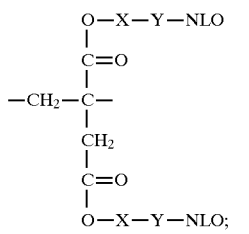

X is not present, or represents alkylene having from 1 to 6 carbon atoms or aromatic hydrocarbon having from 6 to 12 carbon atoms;

Y is a bonding group selected from the group consisting from ether, ester, amide, alkylamino having from 1 to 5 carbon atoms, carbamate and sulfone;

NLO is a general second-order nonlinear optical chemical group in which a conjugated aromatic ring can be unsubstituted or substituted by an electron-donor and/or electron-acceptor; and MO is any polymerizable monomer copolymerizable with ITCN—NLO.

The examples of X include alkylene such as methylene, ethylene, trimethylene, tetramethylene, pentamethylene, etc. and divalent aromatic hydrocarbon such as phenylene, naphthalene, biphenylene, etc. The examples of Y include a bonding group selected from the group consisting from ether, ester, amide, alkylamino having from 1 to 5 carbon atoms, carbamate and sulfone. The examples of the conjugated aromatic ring include benzene, stilbene, azobenzene and diphenyl. The examples of an electron-acceptor include nitro, malonitril, tricyanoethylene, perfluoroalkyl having from 1 to 3 carbon atoms, nitrophenylsulfonyl and methylsulfonyl. The examples of an electron-donor include oxygen, sulfur, alkylamino having from 1 to 6 carbon atoms, cyclic alkyl amine such as piperazine, piperidine, pyrrolidine, etc. All general second-order nonlinear optical chemical groups may be synthesized, and NLO is not limited to the materials having a certain chemical structure in the present invention. The examples of ITCN—NLO include Monomer I as described in Example 1 and Monomer II as described in Example 2. The examples of MO include methylmethacrylate, 4-hydroxyphenyl maleimide and glycidyl methacrylate.

The second-order nonlinear active itaconate used in the present invention is similar to known acrylic esters such as methylmethacrylate as described in U.S. Pat. No. 4,808,332, etc., but they differ in that the itaconate of the present invention has two nonlinear active groups per one repeating unit of a polymer. Consequently, the solubility and ability to form a film of a produced copolymer of the second-order nonlinear active itaconate used in the present invention is equal to or greater than known acrylic esters.

The polymer material according to the present invention as represented in general structure (II) below can be prepared by copolymerizing itaconate having a nonlinear active group (ITCN—NLO) with any polymeric monomers (MO) copolymerizable with said itaconate by general polymerization processes. The polymer material of the present invention can be easily prepared by dissolving these two monomers in a co-solvent at a prescribed ratio and then adding an initiator to a resulting solution by conventional polymerization methods.

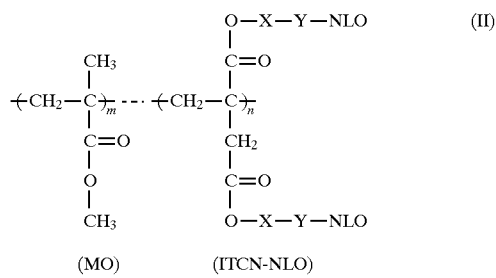

Methylmethacrylate, 4-hydroxyphenyl maleimide and glycidyl methacrylate are used as monomers for copolymerization in the present invention. When the polymer compound of the present invention comprises, respectively, 4-hydroxyphenyl maleimide and glycidyl methacrylate as monomers copolymerizable with itaconate, crosslinking within a chain and between chains can be formed. Thus, crosslinking reactions (homogeneous crosslinking) between epoxy groups of glycidyl methacrylate at the high temperature as much as about 20° C. to 30° C. after an electric-field poling treatment thereof in the vicinity of the compound's glass transition temperature, and chemical bond (heterogeneous crosslinking) of hydroxy groups of 4-hydroxyphenyl maleimide and bifunctional or polyfunctional isocyanate adducts can be slowly derived unlike with known acrylic ester copolymers. Further, when the polymer compound of the present invention is a copolymer comprising maleimide prepared by reacting hydroxy groups of side chains of hydroxyphenyl maleimide with chalcone or cinnamoyl groups, light crosslinking phenomena at a certain wavelength can be derived. In this case, terpolymer can be also synthesized by introducing 4-nitrophenyl methacrylate as a light crosslinking accelerator. The present inventors have succeeded in synthesizing novel nonlinear copolymers having second-order nonlinear optical itaconate monomer, especially having a maximized second-order nonlinear optical constant as a copolymer component by using monomers capable of such a copolymerization, and crosslinking by heat and light.

The copolymer of the present invention as described in the above complete poling phenomena at about 90° to 110° C. due to relatively low glass transition temperature than other known second-order nonlinear polymers at the time of electric-field poling treatment. Also, in the itaconate copolymer of the present invention, thermal crosslinking phenomena that have recently increased interest as the method deriving thermal stability of device performance can derive at about 140° to 150° C. Therefore, in the copolymer of glycidyl methacrylate and methylmethacrylate, it can be completely overcome the disadvantage that a crosslinking reaction progresses due to small difference between glass transition temperature thereof and crosslinking temperature before dipole poling in a medium is optimized, and thereby a poling effect is deteriorated.

In the polymer thin film of the present invention prepared by crosslinking of hydroxyphenyl maleimide and isocyanate or homogeneous crosslinking with glycidyl methacrylate, second-order nonlinear optical constant and electrooptic constant show a very good durability of the effect even at the temperature of 100° C. and more (see, FIG. 1).

Therefore, it is shown that the problems of the thermosetting polymer and side-chain type polymer as described above can be simultaneously solved by using itaconate copolymer of the present invention which is a polymer material having not only processability but also thermal stability. Also, in the polymer material of the present invention, the fact that two second-order nonlinear chromophores can be introduced in one repeating itaconate unit could be estimated as a specificity in the application as a device.

Another important aspect of the itaconate copolymer material according to the present invention is that radical polymerizations or ionic polymerizations of this material with monomers capable of forming any amorphous polymer can be easily made and binary polymers and terpolymers can be also prepared. The glass transition temperature of synthesized copolymers is about 90° to 110° C. Thus, on considering that crosslinking reactions by isocyanate and by epoxy rings after completing poling treatment under electric fields occur at about 130° to 150° C., it is confirmed that the itaconate copolymer material of the present invention have very flowable main chain below crosslinking temperature and the longer the lengths of the side chains thereof is the higher poling of the molecules thereof is. Homogeneous thermal crosslinking epoxy and amine as well as addition of crosslinking agents have an important effect on the maintenance of nonlinear propertiess. Also, in addition to thermal crosslinking phenomena, in the case of the copolymer comprising methacrylate monomers and 4-cinnamoyloxyphenyl maleimide monomer prepared by reacting hydroxy groups of hydroxyphenyl maleimide with cinnamoyl chlorides which the present inventors had used to test in 1995, double bonds are opened by light crosslinking reaction at the region of ultraviolet wavelength and thus cyclobutane type crosslinked structure is formed to contribute thermal stability. Consequently, it can be said that the applicability of the itaconate copolymer according to the present invention is very broad.

In particular, the property of the polymer according to the present invention is directly in relation to a properties exhibiting high second-order nonlinear optical constant. That is, a second-order nonlinear optical constant, $d_{33}$ is known to be in simply proportional to the density of second-order nonlinear active group. Therefore. the two carboxylic groups in itaconic acid can be all substituted by direct esterification or Mizunobu reaction of second-order nonlinear alcohols. The case that only one acid group is substituted can be overcome by polymerization method or by simply removing one substituent of itaconate thus produced. An asymmetric structure by an electric-field poling is efficiently formed due to low glass transition temperature and thus methylmethacrylate type polymers having the different dipole orientation of side chain show higher effect. High nonlinear optical constants and thermal stabilities can be simultaneously achieved by using copolymeric monomers which can form crosslinked structure together with the polymer to subsequently control the poling treatment of dipole orientations and the formation of crosslinkings.

The polymer of the present invention forms thermal crosslinking at high temperature or light crosslinking at a certain wavelength and has the improved density of the chromophores of itaconate, and thereby represents not only superior thermal resistance but also superior nonlinear optical effect. In particular, a high second-order nonlinear optical constant, which is considered as the main outcome of the present invention, is a very important element in a practical use as a device, and has a performance controllable light with low driving voltage in electrooptic modulator device, etc. Therefore, it is well shown that the object for the light device of the next generation can be achieved by the polymer of the present invention.

Hereinafter, the syntheses and properties of side-chain type nonlinear optical polymers having the itaconate comprising two second-order nonlinear active groups according to the present invention as a copolymer component will be more specifically illustrated by the following examples and comparative examples but the scope of the present invention is not limited in any way to the examples.

EXAMPLE 1

The present example relates to a synthesis example of side-chain type nonlinear optical polymer having methylmethacrylate, and an itaconate comprising 4-(N-hydroxyethyl-N-methylamino)-4'-nitrostilbene as copolymer components and having the structure as represented in the reaction equation (I).

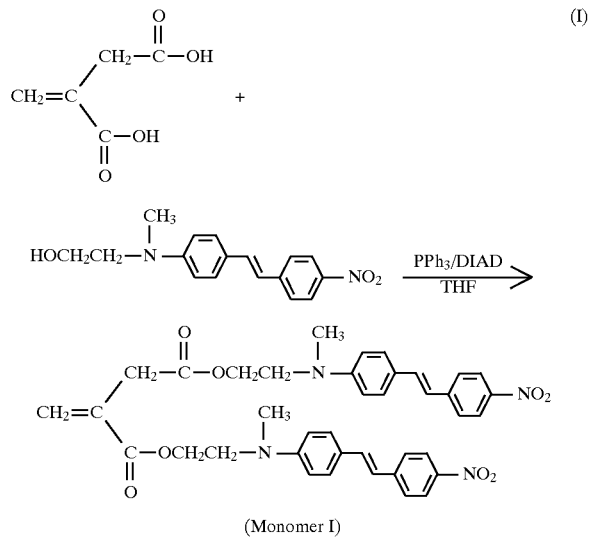

(Monomer I)

Synthesis of Monomer I 785 mg (6.03 mmol) of itaconic acid was dissolved in 10 ml of tetrahydrofuran (THF) to prepare a solution and 2.14 g (10.6 mmol) of diisopropylazodicarboxylate (DIAD) was added to the solution at 0° C. The solution prepared by dissolving 3.00 g (10.1 mmol) of 4-(N-hydroxyethyl-N-methylamino)-4'-nitrostilbene and 2.78 g (10.6 mmol) of triphenylphosphine in 20 ml of tetrahydrofuran was added to the solution previously produced over 30 minutes. The mixture was boiled for 2 hours and cooled to the room temperature and then filtered under the reduced pressure to obtain a solid in the form of orange crystal. This solid was recrystallized from acetonitrile (CH₃CN) and dried under vacuum to obtain Monomer I (2.08 g) with an yield of 59.6%. Melting point: 155.5° C. (by DSC);

¹H—NMR (200 MHz, DMSO—d₆): δ8.18 (d, 4H), 7.79 (d, 4H), 7.51 (d, 4H), 7.40 (d, 2H), 7.10 (d, 2H), 6.72 (m, 4H), 6.12 (s, 1H), 5.72 (s, 1H), 4.20 (t, 4H), 3.61 (C, 4H), 3.22 (s, 2H), 2.98 (d, 6H);

Elementary Analysis: C₃₉H₃₈N₄O₈(690.75):

Calculated: C 67.8, H 5.54, N 8.11, Measured: C 67.5, H 5.61, N 8.09.

Synthesis of Polymer I

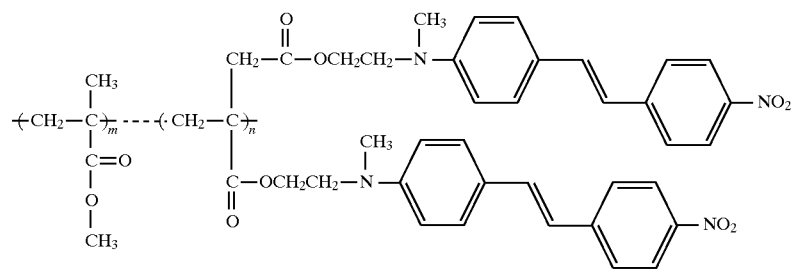

(Polymer I)

The solution of 0.21 g (2.11 mmol) of methylmethacrylate and 1.46 g (2.11 mmol) of Monomer I in 10 ml of N-methylpyrrolidine (NMP) was charged into a polymerization tube, and azobisisobutyronitrile (AIBN) which is a polymerization initiator was dissolved in the solution at 5 mol % concentration. After absolute deairation of the polymerization tube through repeated processes of cooling, thawing and vacuumizing, the tube was sealed and a polymerization was conducted for 48 hours with stirring at the temperature of 65° C. The polymerization solution as prepared was poured to methanol to precipitate and filter a produced polymer. The obtained copolymer was dissolved in tetrahydrofuran and then was reprecipitated in methanol to purify. The purified copolymer was dried in a vacuum oven of 60° C. for 72 hours to prepare the above synthesized polymer. The composition of the synthesized copolymer was measured by the absorbance of dye using UV-Vis spectrophotometry. The result measured for the synthesized copolymer I-A, and copolymer I-B which was synthesized by a similar method to the above is shown in Table 1.

TABLE 1

Synthesis of copolymer of methylmethacrylate and Monomer I

| Copolymer | Composition of polymerization solution | | Composition of polymer | |
|---|---|---|---|---|
| | MMA | ITCN-NLO | MMA | ITCN-NLO |
| I-A | 1 g (9.98 mmol) | 6.88 g (9.98 mmol) | 80.0 mol % | 20.0 mol % |
| I-B | 1 g (9.98 mmol) | 13.77 g (19.96 mmol) | 71.4 mol % | 28.6 mol % |

Note: Compositions of polymerization solution were reduced based on 1 g of MMA.

EXAMPLE 2

Synthesis of Monomer II

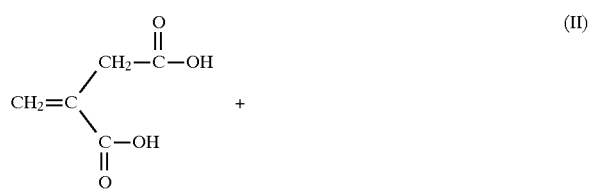

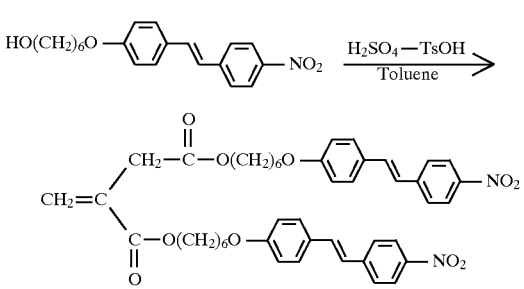

(Momomer II)

2.25 g (17.3 mmol) of itaconic acid and 10.6 g (31.5 mmol) of 4-(6-hydroxyhexyl)-4'-nitrostilbene was dissolved in 80 ml of toluene and one drop of concentrated sulfuric acid and a catalytic amount of p-toluenesulfonic acid were added. The resulting solution was stirred for 48 hours with removing water produced in the reaction using Dean-Stark apparatus and cooled to atmospheric temperature. The reaction product was concentrated, and then was extracted with ethyl acetate solution, washed with saturated solution of sodium hydrogen carbonate and sodium chloride solution and concentrated to obtain a solid. Then, the solid was recrystallized from chloroform to obtain Monomer II (10.0 g) with an yield of 81.7%. Melting point: 143.6° C. (by DSC);

¹H—NMR (200 MHz, DMSO—d₆): δ8.15 (d, 4H), 7.74 (d, 4H), 7.53 (d, 4H), 7.40 (d, 2H), 7.20 (d, 2H), 6.90 (d, 4H), 6.19 (s, 1H), 5.81 (s, 1H), 3.89–4.09 (m, 8H), 3.34 (s, 2H), 1.35–1.67 (m, 16H);

Elementary Analysis: C₄₅H₄₈N₂O₁₀ (776.33):

Calculated: C 69.5, H 6.23, N 3.61, Measured: C 68.9, H 6.80, N 3.58.

Synthesis of Polymer II

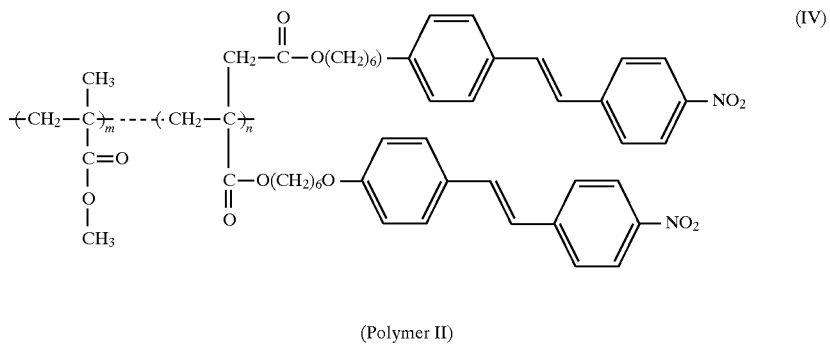

(Polymer II)

The solution of 0.50 g (4.99 mmol) of methylmethacrylate and 3.88 g (4.99 mmol) of monomer II in 25 ml of NMP was charged into a polymerization tube, and azobisisobutyronitrile (AIBN) which is a polymerization initiator was dissolved in the solution at 5 mol % concentration. After absolute deairation of the polymerization tube through repeated processes of cooling, thawing and vacuumizing, the tube was sealed and a polymerization was conducted for 48 hours with stirring at the temperature of 65° C. The resulting polymerization solution was poured to methanol to precipitate a produced polymer, which was recovered by filtering under a reduced pressure. The recovered copolymer was dissolved in tetrahydrofuran and then was repeatedly reprecipitated in methanol to purify. The purified copolymer was dried in a vacuum oven of 60° C. for 72 hours to prepare the above synthesized polymer. The composition of the synthesized copolymer was measured with the solution prepared by dissolving dye in DMF as the standard solution by the absorbance of dye using UV-Vis spectrophotometry. The result measured for the synthesized copolymer II-A, and copolymer II-B which was synthesized by a similar method to the above is shown in Table 2.

TABLE 2

Synthesis of copolymer of methylmethacrylate and Monomer II

| Copolymer | Composition of polymerization solution | | Composition of polymer | |
|---|---|---|---|---|
| | MMA | ITCN-NLO | MMA | ITCN-NLO |
| II-A | 1 g (9.98 mmol) | 7.61 g (9.98 mmol) | 76.9 mol % | 23.1 mol % |
| II-B | 1 g (9.98 mmol) | 15.21 g (19.96 mmol) | 75.7 mol % | 24.3 mol % |

Note: Compositions of polymerization solution were reduced based on 1 g of MMA.

EXAMPLE 3
Synthesis of Polymer III

The present example relates to a synthesis example of side-chain type nonlinear optical polymer having 4-hydroxyphenyl maleimide, and an itaconate comprising 4-methylamino-4'-nitrostilbene as copolymer components and represented in general structure (V).

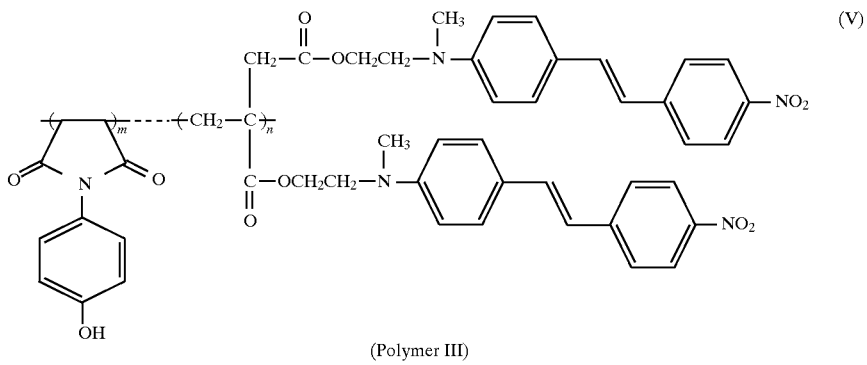

(Polymer III)

The solution of 0.41 g (2.17 mmol) of 4-hydroxyphenyl maleimide and 1.50 g (2.17 mmol) of Monomer I in 10 ml of NMP was charged into a polymerization tube, and azobisisobutyronitrile which is a polymerization initiator was dissolved in the solution at 5 mol % concentration. After absolute deairation of the polymerization tube through repeated processes of cooling, thawing and vacuumizing, the tube was sealed and a polymerization was conducted for 48 hours with stirring at the temperature of 65° C. The resulting polymerization solution was poured to methanol to precipitate a produced polymer, which was filtered. The obtained copolymer was dissolved in tetrahydrofuran and then was repeatedly reprecipitated from methanol. The purified copolymer was dried in a vacuum oven of 50° C. for 72 hours to prepare the above synthesized polymer. The synthesized copolymer was thermally treated at 150° C. for 15 minutes. The composition of the resulted copolymer was measured by nuclear magnetic resonance. The result measured for the synthesized copolymer III-A, and copolymer III-B which was synthesized by a similar method to the above is shown in Table 3.

TABLE 3

Synthesis of copolymer of 4-hydroxyphenyl maleimide and Monomer I

| Copolymer | Composition of polymerization solution | | Composition of polymer | |
|---|---|---|---|---|
|  | HPMI | ITCN-NLO | HPMI | ITCN-NLO |
| III-A | 1 g (5.29 mmol) | 3.65 g (5.29 mmol) | 80.0 mol % | 20.0 mol % |
| III-B | 1 g (5.29 mmol) | 7.38 g (10.58 mmol) | 76.8 mol % | 23.2 mol % |

Note: Compositions of polymerization solution were reduced based on 1 g of HPMI.

EXAMPLE 4

Synthesis of Polymer IV

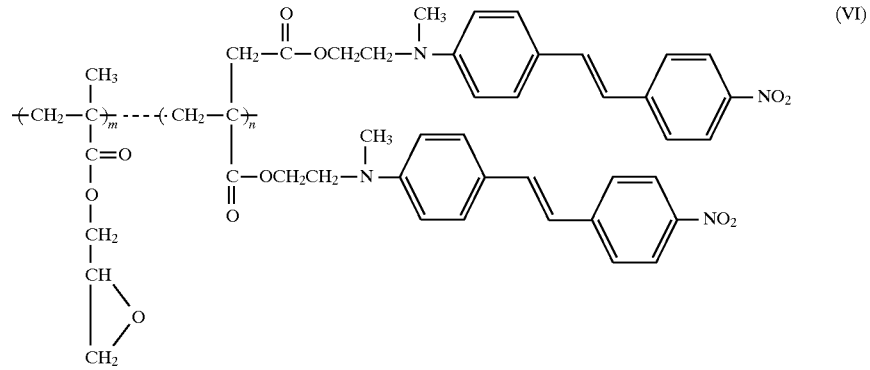

(Polymer IV)

The solution of 0.20 g (1.45 mmol) of glycidyl methacrylate and 1.00 g (1.45 mmol) of Monomer I in 5 ml of NMP was charged into a polymerization tube, azobisisobutyronitrile which is a polymerization initiator was dissolved in the solution at 5 mol % concentration. After absolute deairation of the polymerization tube through repeated processes of cooling, thawing and vacuumizing, the tube was sealed and polymerization was conducted for 48 hours with stirring at the temperature of 65° C. The resulting polymerization solution was poured to methanol to precipitate a produced polymer, which was recovered by filtering. The recovered copolymer was dissolved in tetrahydrofuran and then was reprecipitated from methanol The purified copolymer was dried in vacuum oven of 50° C. for 72 hours to prepare the above synthesized polymer. The synthesized copolymer was thermally treated at 150° C. for 15 minutes. The composition of the resulted copolymer was measured by the absorbance of dye using UV-Vis spectrophotometry. The result measured for the synthesized copolymer IV-A, and copolymer IV-B which was synthesized by a similar method to the above is shown in Table 4.

TABLE 4

Synthesis of copolymer of glycidyl methacrylate and Monomer I

| Copolymer | Composition of polymerization solution | | Composition of polymer | |
|---|---|---|---|---|
|  | GMA | ITCN-NLO | GMA | ITCN-NLO |
| IV-A | 1 g (7.03 mmol) | 4.85 g (7.03 mmol) | 81.3 mol % | 18.7 mol % |
| IV-B | 1 g (7.03 mmol) | 9.71 g (14.06 mmol) | 75.0 mol % | 25.0 mol % |

Note: Compositions of polymerization solution were reduced based on 1 g of GMA.

COMPARATIVE EXAMPLE 1

In order to compare the property of the nonlinear optical polymer having itaconate as a copolymer component in according to the present invention with those of known side-chain type nonlinear optical polymers, side-chain type nonlinear optical copolymer V having methylmethacrylate main chain and represented in the general structure (VII), as described in U.S. Pat. No. 4,694,066, was synthesized.

(Polymer V)

The solution of 2.76 g (27.3 mmol) of methylmethacrylate and 10.0 g (27.3 mmol) of 4-[(methacryloylethyl) methylaminol]-4'-nitrostilbene in 25 ml of chlorobenzene was charged into a 100 ml two-neck flask, and 0.45 g (2.73 mmol) of azobisisobutyronitrile was added to the solution. Then, a produced mixture was purged with flowing argon gas for 30 minutes. A polymerization was conducted with stirring at the temperature of 75° C. for 18 hours. The resulting polymerization solution was poured to cool methanol to precipitate a produced polymer. The precipitated polymer was washed several times with methanol and dried in a vacuum oven of 70° C. for 72 hours to obtain the above synthesized polymer.

EXAMPLE 5

The second-order nonlinear optical properties of Polymer I-A having itaconate as a copolymer component, as prepared in Example 1 of the present invention were compared with that of methylmethacrylate type Polymer V of Comparative Example 1, which is common side-chain type polymer. Polymer I-A prepared in Example 1 and Polymer V prepared in Comparative Example 1 were, respectively, dissolved in THF/cyclohexanone. The obtained solutions were, respectively, spin coated on the transparent micro slide glass, dried, and then used as the samples for measurement. Here, the thickness of the thin films was measured using Tenco surface analyzer (resolution: 5 Angstrom), The produced thin film were subjected to electric-field poling treatment to represent two-order nonlinear properties. Here, corona poling treating method which design them to aluminum flat plate structure earthen with tungsten wire, was used. The sample was placed on a corona discharge unit, and then the temperature of the aluminum flat plate positioned beneath the sample was risen from a glass transition temperature measured by means of a differential thermal analyzer into about 10° C. and less. Thereafter, the DC voltage of from 5 to 6 kilo voltage from high voltage transmitting device was applied to the tungsten wire. This was maintained for about 15 minutes, and then the temperature of the under flat plate was cooled to the atmospheric temperature over 30 minutes. The applied DC voltage was continued to maintain, and the electric field was removed after completely cooling of the flat plate to the normal temperature.

The second-order nonlinear optical constant of the sample was measured using a basic light source emitting from Nd:YAG pulse laser at 1064 nm wavelength by means of the second harmonic generation method. A crystal cut in a direction of Y axis was used in a second harmonic signal as the standard and thereby nonlinear constants were calculated by a Maker Fringe method which is well known in the art.

The Polymer I-A of the present invention and the Polymer V of the Comparative Example have, respectively, 90 pm/V and 45 pm/V as the initial nonlinear optical constant, $d_{33}$ value. Also, 4-methylamino-4'-nitrostilbene, which is a nonlinear optical group, was used for preparing these two polymers. However, the itaconate polymer of the present invention comprising two nonlinear optical groups per one itaconate monomer represents higher second-order nonlinear properties about two times than the methylmethacrylate type polymer of the Comparative Example.

FIG. 1 is the graph comparing the second-order nonlinear optical constants, $d_{33}$ values and the thermal stabilities at 100° C. of side-chain type nonlinear optical itaconate copolymers of the present invention with those of a methylmethacrylate type side-chain type nonlinear optical polymer which is a common side-chain type polymer, respectively, FIG. 1 shows that all itaconate copolymers synthesized according to the present invention have high second-order nonlinear optical constants, and also the polymers of the present invention except for the Polymer I-A are better than the common comparative Polymer V in the thermal relaxation behavior.

We claim:

1. A side-chain type second-order nonlinear optical polymer compound having a repeating unit as represented in general structure (I)

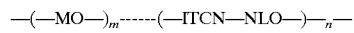

wherein the sum of m and n is from 5 to 10000 and m and n satisfy m/(m+n)=from 0.05 to 0.95;

ITCN—NLO is

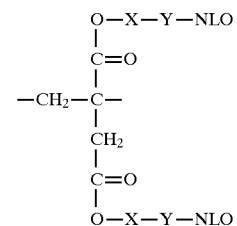

X is not present, or represents alkylene having from 1 to 6 carbon atoms or aromatic hydrocarbon having from 6 to 12 carbon atoms;

Y is a divalent bonding group selected from the group consisting of ether, ester, amide, alkylamino having from 1 to 5 carbon atoms, carbamate and sulfone;

NLO is a general second-order nonlinear optical chemical group in which a conjugated aromatic ring can be unsubstituted or substituted by an electron-donor and/ or electron-acceptor, said chemical group being selected from the group consisting of benzene, stilbene, azobenzene and diphenyl; and MO is any polymerizable monomer copolymerizable with ITCN—NLO.

2. The polymer compound according to claim 1, wherein the sum of m and n is from 15 to 1000.

3. The polymer compound according to claim 1, wherein MO is methylmethacrylate, 4-hydroxyphenyl maleimide or glycidyl methacrylate.

4. The polymer compound according to claim 1, wherein the conjugated aromatic ring is benzene.

5. The polymer compound according to claim 1, wherein the conjugated aromatic ring is stilbene.

6. The polymer compound according to claim 1, wherein the conjugated aromatic ring is azobenzene.

7. The polymer compound according to claim 1, wherein the conjugated aromatic ring is diphenyl.

8. The polymer compound according to claim 1, wherein the electron-donor is oxygen, sulfur, alkylamino having from 1 to 6 carbon atoms or cyclic alkyl amine.

9. The polymer compound according to claim 8, wherein the cyclic alkyl amine is piperazine, piperidine, or pyrrolidone.

10. The polymer compound according to claim 1, wherein the electron-acceptor is nitro, malonitrile, tricyanoethylene, perfluoroalkyl having from 1 to 3 carbon atoms, nitrophenylsulfonyl or methylsulfonyl.

11. The polymer compound of claim 1, comprising repeating units of the formula

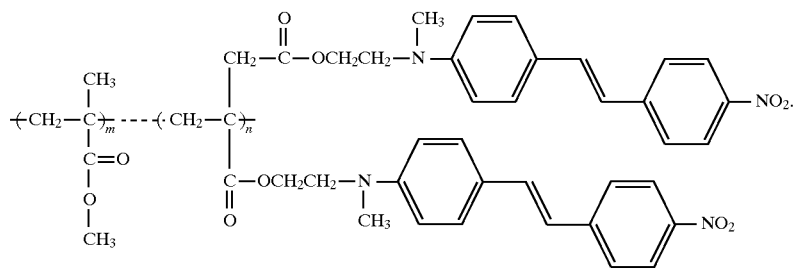
12. The polymer according to claim 1, comprising repeating unit of the formula
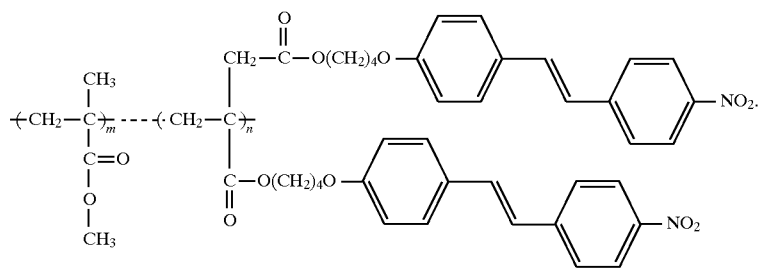
13. The polymer compound of claim 1, comprising repeating units of the formula
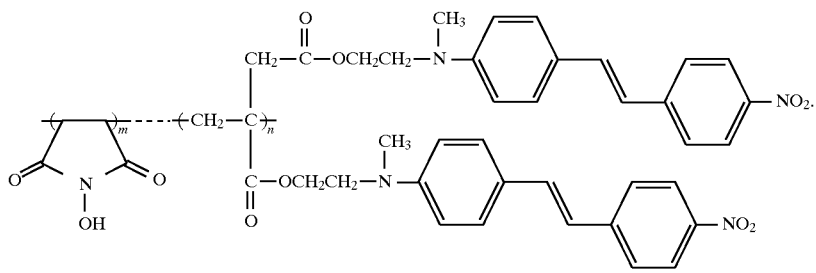
14. The polymer compound of claim 1, comprising repeating units of the formula
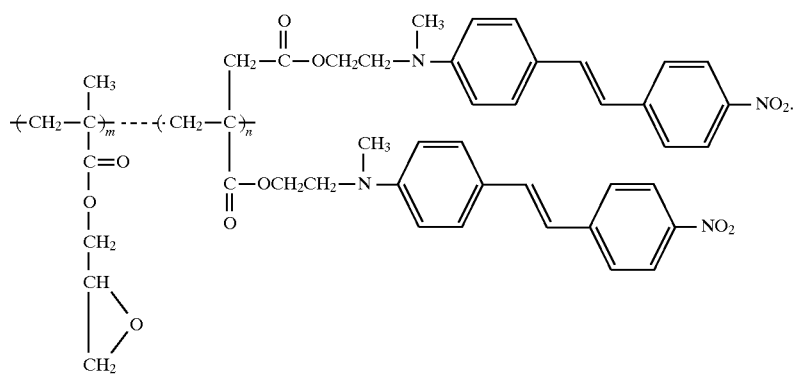
* * * * *